Dec. 26, 1967  J. W. SEEKINS  3,359,656
ANSWER SHEET INDICATING CORRECTNESS AND RECORDING ERRORS
Filed Jan. 13, 1966

INVENTOR.
J. William Seekins
BY
Pearson + Pearson
ATTORNEYS

United States Patent Office 3,359,656
Patented Dec. 26, 1967

3,359,656
ANSWER SHEET INDICATING CORRECTNESS AND RECORDING ERRORS
John W. Seekins, Tewksbury, Mass., assignor to Courier-Citizen Company, Lowell, Mass., a corporation of Massachusetts
Filed Jan. 13, 1966, Ser. No. 520,504
4 Claims. (Cl. 35—48)

ABSTRACT OF THE DISCLOSURE

An answer sheet device comprising only two superposed sheets, peripherally adhered to form a closed, sealed envelope, the two hidden interior faces and the two exposed exterior faces of the sheets being flat and planar. One exposed outer face carries a pattern of multiple choice examination questions in conventional printing ink and one hidden interior face carries a corresponding pattern of right and wrong symbols thermo-engraved in a relatively thick, sharp edged layer of transparent, resinous adhesive printing ink. One hidden interior face also carries an opaque, transfer coating, such as carbon ink. Marking the answer blocks with a pencil causes an image of a "right" or "wrong" symbol to appear on the conventionally printed exterior face, for instant recognition of accuracy by the student, while a carbon mark appears on an interior face to indicate the number of efforts to achieve a right answer for each question.

---

The present invention relates to a novel image-transfer sheet assembly and particularly to an assembly on which it is possible to mechanically transfer an initially-invisible image from a remote surface thereof to a visible surface thereof. The invention also relates to the novel processes utilized in manufacturing and using the aforesaid novel transfer-sheet assembly.

There are a number of applications for a transfer sheet assembly wherein the marking of one piece of paper transfers an image either to another sheet of paper or to the sheet of paper being marked or to both. One of the more important applications for this kind of transfer sheet assembly is in the testing field where it is often desirable not only to have the student select an answer but also to immediately recognize whether the answer he selected was right or was wrong. Such "instant information" is believed to be of significant aid to the learning process. Moreover, if the type of test being given is a multiple-choice test in which evaluation of a student's performance may be weighed not only by his immediate choice of the most preferred answer but also, should he initially miss the most preferred answer, by his second or third choice, then it is desirable to signal the student by means of a transfer assembly such as that described herein to continue to make selections until he has answered correctly. Of course the total number of answers he has selected to a single question would be indicative of his ranking of the preferred answer.

Other utilities exist for such transfer sheets; for example in recreational games.

Among desirable features in such an image-transfer sheet assembly are versatility in respect to suitability for scoring in various scoring machines utilizing electronic, chemical or mechanical techniques; resistance to premature answer-detection by students taking a test, and resistance to involuntary marking. To be practical and useful, any such multiple-choice, machine-scorable, response sheet, capable of providing instant recognition of correct or wrong answers must be of low cost and capable of high speed production and capable of passing through a scoring machine.

A number of such transfer-sheet assemblies capable of instantly apprising a student of the correctness of his answer have been suggested, but these assemblies have employed the use of such devices as special color-reactant organic chemical compounds (as disclosed in U.S. Patent No. 2,618,866), the use of light projected through translucent surfaces (as disclosed in U.S. Patent No. 2,859,-541), the use of an embossed, matrix-like insert in a covering envelope as in U.S. Patent No. 3,248,808 and other such expensive or cumbersome devices.

In one prior art device, a sealed envelope having the usual adhered flaps contains a cardboard card bearing raised symbols thereon, the student marking the front face of the envelope by shading with a pencil, whereupon an appropriate right or wrong symbol appeared in the shading. This device proved impractical and too expensive for use in schools and did not provide for internal recording of erasures, or rubbing by the student.

Therefore, it is a principal object of the present invention to provide an image-transfer sheet assembly of simple and inexpensive sealed, two sheet envelope wherein an invisible image is made visible upon the marking of an uppermost sheet of the envelope, and wherein any rubbing or erasures by the student are internally recorded on one of the two interior faces of the envelope.

It is a further object of the invention to provide an image-transfer sheet assembly formed of only two sheets, wherein a transfer coating, such as carbon, is provided so that said invisible image, or some other surface, is also marked to provide a record of the markings in addition to the record formed by the direct marking of an outer sheet by the user thereof.

It is another object of the invention to provide an unusually low cost, two ply answer envelope having thermo-engraved sharp edged raised ink symbols on one inner face and a carbon ink coating on the other inner face which may be utilized in grading a student's response on the basis of the ranking he gave a correct answer, i.e. whether or not the answer was his first, second or even twenty-second choice.

It is a further object of the invention to provide an image-transfer sheet assembly adaptable for processing in a variety of test correcting machines and the like wherein it is unnecessary that the image transfer be accomplished with any special marking instrument.

Other objects of the invention are in part obvious and in part will be apparent from the description of the invention set forth below.

The multiple choice, machine scorable response sheet assembly of the invention comprises essentially at least two superposed sheets of low cost material such as paper, suitably adhered to each other around the marginal edges to form a sealed, low cost integral unitary sheet-like envelope. The envelope has two exterior faces and two interior faces, the latter two faces being free of adhesive to permit easy separation thereof when desired. One exterior face of the unit contains suitable printed indicia, in a predetermined pattern of multiple choice marking spaces, arranged for inscription by an examinee with a pencil or other marking device to indicate the choice of a correct response to a question. One interior face of the unit contains a predetermined pattern of sharp-edged symbols, each formed by a thermo-engraved deposit, or layer, of transparent ink of substantial thickness, each underlying one of the marking spaces and each in a plane spaced from the plane of the face, some symbols indicating a correct choice and some indicating a wrong choice. Another interior of the unit contains an opaque transfer means, preferably of the carbon coating type, for not only preventing see-through, but for permanently recording on the other interior face of the sealed unit, any rubbing or erasures made by the student. Preferably the opaque transfer coating is on the interior face of the top sheet, and the raised symbols constituting invisible images, are on the interior face of the lower sheet, the latter face also having identical printed indicia corresponding to the top sheet. Thus the lower sheet may be stripped and marked by a scoring machine, with a record of all markings made by the student, including his erasures, and the marked top sheet upon which the symbols, or images, have been made visible, may be retained by the teacher or student if desired.

A separate carbon paper sheet may be inserted between the image-transfer sheet and the image-carrying sheet, rather than applying the opaque transfer coating to an interior face of the assembly and the assembly may provide snap-out means for removing the carbon sheet. The marking transfer sheet, or coating, may have suitable pigments in the coating for sensing by various types of scoring machines, for example, carbon pigments, metal particles, magnetized particles, or the like.

In this application and accompanying drawings, I have shown and described a preferred embodiment of my invention and have suggested various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be enabled to modify it and embody it in a variety of forms, each as may be best suited to the condition of a particular case.

Figure 2:
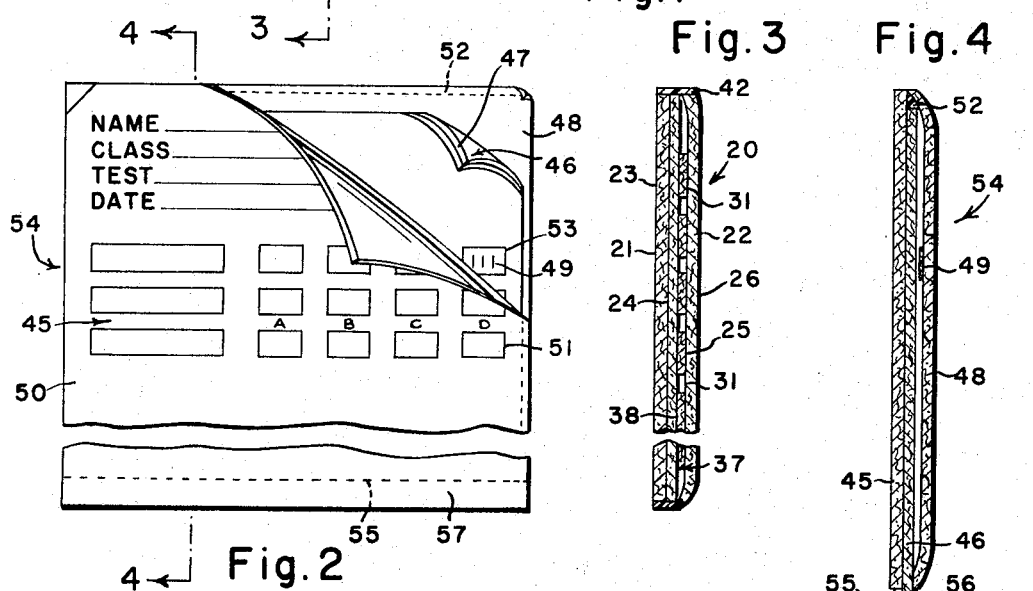
FIGURE 2 is a view similar to FIGURE 1 of another embodiment of the invention.
Figures 3, 4:
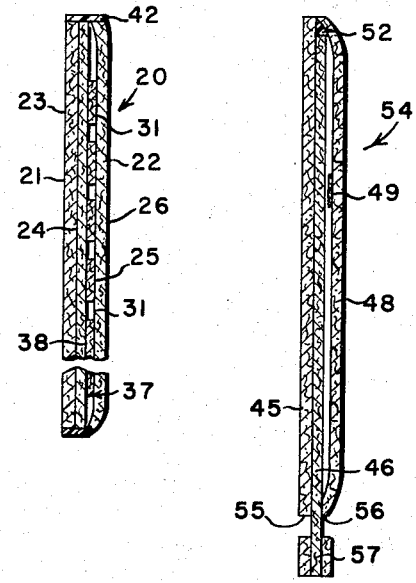
FIGURE 3 is a view in section on line 3—3 of the assembly shown in FIGURE 1.
Figure 5:
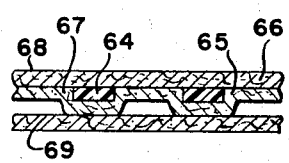
Figure 6:
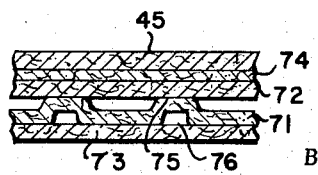

FIGURE 4 is a view in section in line 4—4 of the assembly shown in FIGURE 2; and FIGURES 5 and 6 are fragmentary sectional views similar to FIGURES 3 and 4 of other embodiments of the invention.

Figure 1:
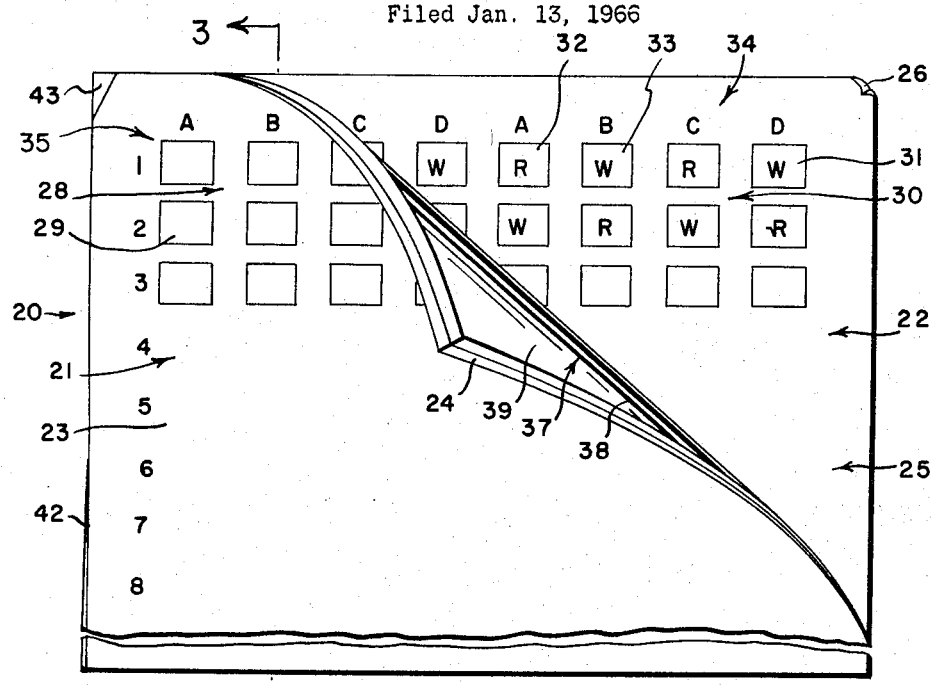
FIGURE 1 is a plan view of a preferred embodiment of the invention with sheets turned back for clarity and to reveal structure.

In FIGURE 1, the preferred form of the multiple choice, machine scorable response sheet assembly of the invention is designated 20. Assembly 20 is an envelope formed of two superposed sheets 21 and 22, sheet 21 having a flat planar obverse face 23 and a flat planar reverse face 24, and sheet 22 having a flat planar obverse face 25 and a flat planar reverse face 26. The assembly 20 thus has two exterior planar faces 23 and 26, and two interior, planar faces 24 and 25.

The obverse face 23 of sheet 21, which is one of the exterior faces of the assembly 20, is provided with suitable printed testing indicia, including the predetermined pattern 28 of marking spaces, or blocks, 29, the spaces being in a plane spaced from the plane of the face 25. the choice of a correct answer to multiple choice questions. Sheet 21 is preferably of low cost thin paper stock, while sheet 22 is preferably of relatively thick, low cost, cardboard stock.

The obverse face 25 of sheet 22 is provided with a predetermined pattern 30 of sharp-edged images, or symbols, 31, each image underlying one of the spaces 29 and being in a plane spaced from the plane of the face 25. Some of the images 31, as at 32, are formed to indicate a correct answer, for example, the letters R or C, while others of the images, as at 33, are formed to indicate an incorrect answer, for example, the letter W. Preferably a duplicate pattern 34 of all printed indicia 35 on face 23, is provided on face 25, so that either sheet may be scored.

An opaque transfer means 37 is interposed between the interior faces 24 and 25 of assembly 20, preferably in the form of a coating 38 of carbon ink 39 for preventing see-through and for permanently transferring any pressure marks, rubbings or erasures made by the student on the visible face 23 onto the invisible, sealed face 25 of sheet 22.

The images or symbols 31 are formed by thermoengraving wherein a resin adhesive, or some other suitable tacky ink is applied to the face and transparent pigments of resin or some other suitable pigment are applied to the resin pattern, such images or symbols being raised and being reproduced, or transferred to the blocks 29 when the block is shaded with any instrument such as a pencil.

To maintain low cost, the sheets 21 and 22 are adhered to each other around all of the marginal edge 41 of the assembly, preferably by brushing an adhesive 42 onto the exposed edges of a stack of the assemblies 20, such adhesion being sufficient to seal the superposed sheets for use as a sealed envelope in an examination while permitting easy stripping for machine scoring, if such stripping is required. An unsealed assembly turned in by a student has obviously been tampered with and is not marked. A corner 43 of each sheet 21 is underfolded or cut off to permit easy separation of the adhered stack into individual assemblies 20.

Numeral images, such as 1, 2, 3, 4, etc., may be used to immediately inform the examinee of the relative desirability of his answer to a multiple choice question as to whether it is the best, second best, or least favorable answer.

With reference to FIGURES 2 and 4, it is seen that a student who must answer a question (symbolized for descriptive purposes by the question mark on the left hand side of upper sheet 45 of FIGURE 2) may select any of four answers identified as A, B, C, and D. These answers may be printed directly on the answer sheet or may be printed on a separate sheet as is convenient for the purposes of a particular test. A carbon paper 46 is placed beneath sheet 45 with its carbon coating 47 facing backing sheet 48 which has raised sharp-edged images, or symbols, 49, coated thereon, similar to the sharp edged letters 39 but in the form of numerals. The numeral images 49 are adapted to inform the student of the relative desirability of his answer, i.e., whether it is the best, second best, third best, or least favorable answer.

It is seen that a visible upper sheet 45 having a smooth outer surface 50 is placed over the opacifying sheet 46 having the carbon surface 47 and the image-backing sheet 48 having raised transparent resinous ink areas forming sharp-edged images 49 thereon which images 49 are so placed in respect to sheet 45 that they register meaningfully with answer blocks 51 appearing on sheet 45. Backing sheet 48 is of light board stock to facilitate the manipulation of the test sheet by a student and to provide a firm back-up for any pressure exerted on the test sheet by the student. A starch-based adhesive material 52 joins sheets 45 and 48 around the marginal edges thereof in such a way that the sheets form an integral unitary two ply envelope with a single carbonized insert sheet. After the upper sheet 45 has been marked, a record of the answers selected will appear both on the upper sheet 45 and on the image areas 53 (because of the carbon ink 47 transferred from sheet 46). Thus on disassembly of the assembly, the tester will not only have a copy which may be submitted for machine testing but also a copy to retain.

The assembly 54 shown in FIGURES 2 and 4 preferably comprises a carbon 46 of slightly less area than the area of the sheets 45 and 48, the sheets 45 and 48 having perforated lines of weakness at 55 and 56, defining a pull tab 57 to which the carbon 46 is attached. By tearing the assembly along the lines of weakness, the carbon may thus be snapped out, as shown in FIGURE 4.

As shown in FIGURE 5, the images, or symbols, 64 may be formed of a relatively thick layer, or deposit, of resinous, transparent ink on the reverse face 65 of the upper, or test, sheet 66, with the mark transfer coating 67 also on the face 65, or on the corresponding face of a transfer insert sheet. In this embodiment, the images 64 become visible on the obverse face 68 of upper sheet 66, when shading is applied by the student, the shade, pressure or erasure marks are transferred to the lower sheet 69 and the latter sheet is smooth and planar for introduction into a scoring machine.

If not specifically mentioned, it is to be understood that each embodiment of the invention is desirably formed into a sealed, unitary assembly by use of an adhesive coated over the entire perimeter thereof.

Another embodiment of the invention is shown in FIGURE 6, wherein sheet 71 is placed with a transfer-surfaced sheet 72 between an upper sheet 45 and a backing sheet 73. In this case, transfer surface 74 faces sheet 45 and forms means for marking the reverse face thereof with a magnetic ink. Sheet 71 is shown as embossed with the fibres of the sheet deformed with raised images 75 on one side and a corresponding indented image 76 on the opposite side thereof. It will be noted that thermo-engraved ink symbols are preferable, however, as not only creating sharper edges on the symbols but avoiding the indents 76 which can be felt and seen by the student and thus must be covered by the additional backing sheet 73.

When this assembly is utilized not only is the visible portion of top sheet 45 marked but the underside of top sheet 45 is also marked with magnetic ink thus doing away with the necessity of the user, i.e. game-player, student, etc., having a special marking pencil.

In operation the pressure of a pencil or other marking instrument applied in shading a selected answer block 29 will bring the heretofore invisible image 31 into sharp relief. Although only light pressure is required for this operation it is advantageous to have a sufficiently heavy backing sheet to resist the heavy pressure which is likely to be applied from time to time by the user. Best results are believed obtained with a light cardboard stock.

It has also been found advantageous to use a weight of paper for the upper sheet of at least 13 to 15 pounds per thousand square feet. This avoids an examinee's feeling the sharp-edged image through the top sheet and transfer coating.

It will be readily realized that the number of copy sheets may be varied as required and that various assemblies may be prepared using whatever number of copy sheets is deemed most desirable. Furthermore, the copy paper need not be carbon paper but can be any of the various improvements such as the encapsulated-ink type papers known to the art, etc.

What is claimed is:

1. A multiple choice, machine scorable, response sheet assembly, providing instant recognition of correct or wrong choices, said sheet comprising two superposed sheets, adhered to each other around the marginal edges thereof to form an integral, unitary two ply, sealed envelope, said envelope having two exterior planar faces and two interior planar faces;

a predetermined pattern of marking spaces on one said exterior face, said spaces being arranged for inscription by an examinee to indicate the choice of a correct response;

an identical pattern of sharp-edged symbols, each formed by a relatively thick layer of transparent, ink-underlying one of said spaces and being in a plane like material on one said interior face, each symbol spaced from the plane of said face, some said symbols representing a correct choice and other said symbols representing an incorrect choice; and an opaque transfer coating on one said interior face, said coating preventing see-through and permanently transferring any pressure marks made in the spaces on said exterior face onto the other said interior face.

2. A sheet assembly as specified in claim 1, wherein said spaces are on the exterior face, and said opaque transfer coating is on the interior face, of one said sheet, and said symbols are on the interior face of the other said sheet;

and said coating is of a transfer material capable of being sensed by said scoring machine;

whereby said other sheet is capable of being marked by said machine when stripped from said one sheet.

3. A sheet assembly as specified in claim 1, wherein said sharp edged symbols are formed on the interior face of the said sheet bearing said marking spaces on its exterior face, whereby said other sheet may be stripped therefrom and passed through a scoring machine with planar faces marked only by the transfer markings of said transfer means.

4. A sheet as specified in claim 1, wherein one said sheet is of relatively thin paper stock with said spaces on the exterior face thereof and with said opaque transfer coating on the other, or interior face thereof, and said other sheet is of relatively thick cardboard stock with said pattern of sharp-faced symbols on the interior face thereof, whereby all inscription marks and erasure marks in the spaces of said one sheet are permanently transferred to said other sheet, and said other sheet may be machine scored by sensing of the transfer marks thereon.

References Cited

UNITED STATES PATENTS

| | | | |
|---|---|---|---|
| 2,026,115 | 12/1935 | Anthony | 101—274 |
| 2,495,388 | 1/1950 | Ryan | 282—23 |
| 2,614,338 | 10/1952 | Clark | 35—48 |
| 3,104,799 | 9/1963 | Steidinger | 282—25 |
| 3,248,808 | 5/1966 | Daker et al. | 35—48 |

EUGENE R. CAPOZIO, *Primary Examiner.*

R. WEIG, *Assistant Examiner.*

UNITED STATES PATENT OFFICE
CERTIFICATE OF CORRECTION

Patent No. 3,359,656                                    December 26, 1967

John W. Seekins

It is hereby certified that error appears in the above numbered patent requiring correction and that the said Letters Patent should read as corrected below.

Column 6, line 6, after "ink-" insert -- like material on one said interior face, each symbol --; line 12, for "opague" read -- opaque --.

Signed and sealed this 14th day of January 1969.

(SEAL)
Attest:

Edward M. Fletcher, Jr.                                    EDWARD J. BRENNER

Attesting Officer                                             Commissioner of Patents